United States Patent
Hafner et al.

[11] Patent Number: 5,848,404
[45] Date of Patent: Dec. 8, 1998

[54] FAST QUERY SEARCH IN LARGE DIMENSION DATABASE

[75] Inventors: James Lee Hafner, San Jose; Nimrod Megiddo; Eliezer Upfal, both of Palo Alto, all of Calif.

[73] Assignee: International Business Machines Corporation, Armonk, N.Y.

[21] Appl. No.: 823,396

[22] Filed: Mar. 24, 1997

[51] Int. Cl.⁶ .................................................. G06F 17/30
[52] U.S. Cl. ..................... 707/3; 707/5; 707/6; 707/100; 707/101
[58] Field of Search ............... 707/3, 100, 101, 707/5, 6

[56] References Cited

U.S. PATENT DOCUMENTS

| | | | |
|---|---|---|---|
| 4,135,147 | 1/1979 | Riganati et al. | 340/146.3 E |
| 4,667,550 | 5/1987 | Ferguson | 707/3 |
| 4,799,270 | 1/1989 | Kim et al. | 382/27 |
| 5,276,895 | 1/1994 | Grondalski | 395/800 |
| 5,289,567 | 2/1994 | Roth | 345/433 |
| 5,329,596 | 7/1994 | Hiroshi et al. | 382/226 |
| 5,331,554 | 7/1994 | Graham | 707/5 |
| 5,350,303 | 9/1994 | Fox et al. | 434/118 |
| 5,404,512 | 4/1995 | Powers | 707/3 |
| 5,485,612 | 1/1996 | Ota et al. | 395/670 |
| 5,497,485 | 3/1996 | Ferguson et al. | 707/1 |
| 5,521,910 | 5/1996 | Mattews | 370/256 |
| 5,664,174 | 9/1997 | Agrawal et al. | 707/6 |
| 5,701,467 | 12/1997 | Freeston | 707/3 |
| 5,710,916 | 1/1998 | Barbara | 707/3 |

OTHER PUBLICATIONS

Bozkaya et al., "Distance–based indexing for high dimensional metric spaces", Sigmod Record, vol.26, No.2, p.357–368, Jun. 1997.

Berchtold, et al., "Fast nearest neighbor search in high–dimensional space", IEEE, p.209–218, Feb. 1998.

"Architecture and User Interface of Intelligent Multimedia Database System Trademark", Electrotechnical Laboratory, vol. 52, No. 7, 1988, pp. 1–20.

"Trademark: Multimedia Image Database System with Intelligent Human Interface", Toshikazu Kato, Koreaki Fujimura & Hiroyuiki Shimogaki, Systems and Computers in Japan, vol. 21, No. 11, 1990, pp. 33–46.

*Primary Examiner*—Thomas G. Black
*Assistant Examiner*—Jean R. Homere
*Attorney, Agent, or Firm*—Gray Cary Ware Freidenrich

[57] ABSTRACT

A computer-implemented database search method includes arranging data points in a tree structure, with upper nodes being labeled by respective randomly selected representative data point and with the distance between each data point which is related to a first node and the label of the first node being less than the distance between the data point and the label of nodes in other branches. When a query is received, the distance between the query and the label of each node in the upper-most level is determined, and the nodes arranged in sequence, shortest distance first. Then, the process is repeated for the first "f" nodes in the sequence, and so on, until a sequence of leaves (i.e., data points having no dependent nodes or leaves) is obtained. The first "k" leaves are returned as the "k" closest database matches to the query. Alternatively, geometric information pertaining to the data points is recorded when the database is populated, and then, for query execution, nodes of data are ranked according to the geometric information as it relates to the query, with the node rankings terminated when a high bound for the geometric relationship between the query and a node is reached.

29 Claims, 4 Drawing Sheets

FAST QUERY SEARCH IN LARGE DIMENSION DATABASE

BACKGROUND OF THE INVENTION

1. Field of the Invention

The present invention relates generally to computer databases, and more particularly to systems for undertaking rapid query searches in large-dimension databases.

2. Description of the Related Art

Executing queries in databases that store data points having many elements can require excessive search time, and it is on this problem that the present invention is focussed.

Databases which store data points, each of which is defined by many (e.g., >20) elements, are said to have large dimensionalities, i.e., many dimensions. Often, it is desired to access particular large dimension data points using queries that do not exactly match the data points. For example, a computer user might desire to access computer database information on publicly-traded oil companies that own oil wells in South America. A query for such a search might be "public oil stocks—South America". It will readily be appreciated that the goal would be to return an answer to the user that included near matches to the query request, i.e., data points that are similar to the query.

One way to find the near matches, i.e., similar data points, would be to compare each and every data point in the database to the query. As recognized herein, it is unfortunately the case that the higher the dimensionality of the database, the more complicated the measurement process becomes, particularly if each and every data point is to be measured against the query. Accordingly, the higher the dimensionality, the longer search time is required. Thus, the present invention recognizes the need to quickly and efficiently search a database to return near matches to user queries.

In determining which data points are "near matches" to a query, a measurement is undertaken using a "metric" to determine what can be thought of as a distance between the query and each data point. An example of a metric is the simple Euclidean geometric point-to-point measurement, but it happens that many other metrics can be used, depending on the particular application. In any case, the near matches will be those data points that are located the smallest distances from the query. As recognized herein, it is desirable to provide a method for fast query searching in large dimension databases that is effective regardless of how the query is to be compared to the data points, i.e., that is effective regardless of the particular metric used.

The present invention accordingly recognizes the need to provide a fast query search in a large-dimension database that can be used in conjunction with a large variety of metrics. It is therefore an object of the present invention to provide a system for quickly finding data points in a database that are near matches to a query. Another object of the present invention is to provide a method for quickly executing a query search in a large-dimensionality database. Still another object of the present invention is to provide a method for quickly executing a query search in a database that can be used with a variety of metrics. Yet another object of the present invention is to provide a method for quickly executing a query search in a database that is easy to use and cost-effective.

SUMMARY OF THE INVENTION

The invention is a general purpose computer programmed according to the inventive steps herein to return "k" close database matches to a query Q. The invention can also be embodied as an article of manufacture—a machine component—that is used by a digital processing apparatus and which tangibly embodies a program of instructions that are executable by the digital processing apparatus to return "k" close database matches to a query Q. This invention is realized in a critical machine component that causes a digital processing apparatus to perform the inventive method steps herein.

In accordance with the present invention, the method steps include defining a first level of nodes including internal nodes, with each internal node being labeled by a randomly selected representative data point. The method steps further include defining a second level of nodes including leaf-parent nodes. Each leaf-parent node depends from an internal node, and each leaf-parent node is labeled by a representative data point. Also, each leaf-parent node includes at least one leaf labeled by a data point. In accordance with the present invention, the distance between a leaf and the label of its leaf-parent node is less than the distance between the leaf and the label of any other leaf-parent node.

Preferably, the method steps also include receiving a query Q and in response determining respective query distances between the query Q and at least some of the representative data points corresponding to respective internal nodes under one high node. Then, the internal nodes are listed in a sequence from smallest query distance to greatest query distance, and a subsequence is returned that has a predetermined subset of the internal nodes, starting with the first node in the sequence. Moreover, the method includes receiving the subsequence of internal nodes and, for each internal node in the subsequence of internal nodes, determining respective query distances between the query Q and each representative data point in each leaf-parent node. Next, the leaf-parent nodes of each internal node in the subsequence of internal nodes are arranged in a sequence from smallest query distance to greatest query distance. The method then contemplates returning a subsequence of leaf-parent nodes having a predetermined number of leaf-parent nodes.

Additionally, the method includes receiving the subsequence of leaf-parent nodes and, for each leaf in the subsequence of leaf-parent nodes, determining respective query distances between the query Q and each leaf. The leaves of each leaf-parent node in the subsequence of leaf-parent nodes are arranged in a leaf sequence from smallest query distance to greatest query distance. The first k leaves in the leaf sequence are returned.

If desired, a data point can be added to the database by adding a new leaf to the tree, the new leaf having, as a label, the data point. Per the present invention, the new leaf is added to a leaf-parent node that has a representative data point closer to the new leaf than the representative data points of the other leaf nodes. Alternatively, a data point is added to the database by adding a new leaf to the tree, the new leaf having, as a label, the data point. The new leaf is added to an auxiliary leaf-parent node, the auxiliary leaf-parent node being traversed for each query.

In another aspect of the present invention, a computer program product is disclosed which is readable by a digital processing apparatus and which tangibly embodies a computer program. The computer program product combines a computer readable medium with program code elements that return "k" close database matches to a query Q.

In this invention, the code elements are embodied in a program stored on the computer readable medium. These code elements include computer readable code means for arranging the database in a tree structure having at least an internal node level including internal nodes, a leaf-parent node level including leaf-parent nodes, and a leaf level including leaves. Each internal node and leaf-parent node represents clusters of data points, and each cluster is defined by (1) a respective representative data point and (2) respective dependent data points. In accordance with the present invention, the distance between each representative data point in a level and its dependent data points is less than the distance between the dependent data point and the respective representative data point of any other cluster in the level.

Computer readable code means are also provided for receiving a query Q and in response determining respective query distances between the query Q and each representative data point in each internal node. Moreover, computer readable code means are provided for arranging the internal nodes in a sequence from smallest query distance to greatest query distance. Computer readable code means return a subsequence having a predetermined number of internal nodes, starting with the first node in the sequence.

A computer-implemented method is also disclosed for arranging data points in a database. The method includes the steps of defining a first level of nodes including internal nodes, with each internal node being labeled by a representative data point. The method further includes defining a second level of nodes including leaf-parent nodes, with each leaf-parent node depending from an internal node. Each leaf-parent node is labeled by a representative data point, and each leaf-parent node includes at least one leaf labeled by a data point. As intended herein, the distance between a leaf and the label of its leaf-parent node is less than the distance between the leaf and the label of any other leaf-parent node.

In an alternate embodiment, the nodes in the sequence are arranged according to geometric relationships with each other, prior to testing the data points in the nodes for query matches. More specifically, a computer is disclosed that includes a data storage device including a computer usable medium having computer usable code means for identifying data points that are similar to a query, with the data points being stored in a database accessible by the computer. Per the present invention, the computer usable code means has computer readable code means for arranging the database in a tree structure having data nodes. Each node contains clusters of data points, and each cluster is defined by (1) a respective randomly selected representative data point and (2) respective dependent data points. Computer readable code means record geometric information for each node, and computer readable code means receive a query Q and in response lists the nodes in a sequence of increasing order of lower bounds. Per this embodiment, the lower bounds are determined based on the geometric information. Computer readable code means are provided for returning the sequence of the nodes for searching thereof.

In a preferred version of the alternate embodiment, computer readable code means list, in the sequence of nodes, only nodes having lower bounds less than a current upper bound between the query Q and a representative data point. As envisioned herein, the current upper bound is the greatest lower bound of a representative data point in the sequence. Further, computer readable code means determine a distance between a first representative data point and a second representative data point by determining, for the first representative data point, a polyhedron cell. A first maximum distance that a hyperplane containing the first and second representative data points can be moved, in a direction parallel to a line connecting the first and second representative data points while intersecting the polyhedron cell, is then determined. With this structure, computer readable code means then determine an upper bound between the query Q and a representative data point by determining a maximum distance that a hyperplane containing the query Q and the representative data point can be moved in a predetermined direction without intersecting the polyhedron cell. Alternatively, in lieu of undertaking the linear programming steps described above, computer readable code means can determine a distance between a first representative data point and a second representative data point by determining a first maximum distance that a hyperplane containing the first and second representative data points can be moved in a direction parallel to a line connecting the first and second representative data points while intersecting at least one predetermined data point.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

This invention relates to returning a predetermined number "k" of data points in a high dimension (e.g., >20) database that are close matches to a user query. By "close matches" is meant that the distance between each returned data point and the query is minimized, relative to the distances between the query and other non-returned data points in the data base. Furthermore, "distance" as used herein means the difference between two points of data as measured by a suitable metric such as, e.g., a Euclidean distance measure. It is to be understood, however, that the principles of the present invention apply to a wide variety of metrics.

Figure 1:
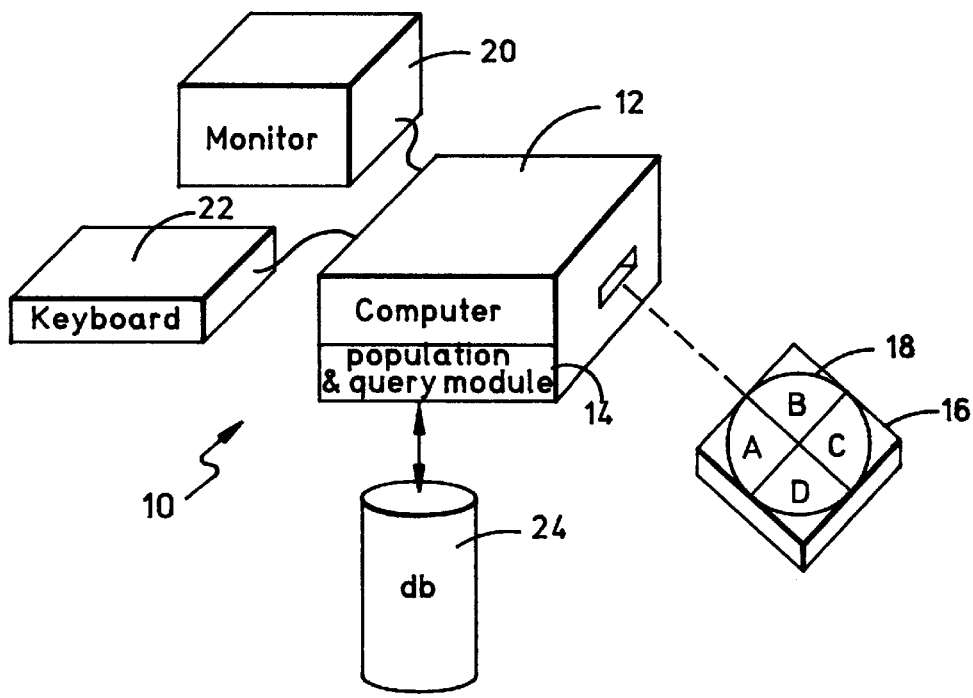
FIG. 1 is a schematic diagram of the query search system of the present invention.

Referring initially to FIG. 1, a system for identifying data points that are similar to a query is shown, generally designated 10. In the particular architecture shown, the system 10 includes a digital processing apparatus, such as a computer 12. In one intended embodiment, the computer 12 may be a mainframe computer made by IBM Corp. of Armonk, N.Y., and use an operating system sold under trademarks such as MVS. Or, the computer 12 may be a Unix computer, or OS/2 server, or Windows NT server, or IBM RS/6000 250 workstation with 128 MB of main memory running AIX 3.2.5.

As shown, the computer 12 includes a population and query module 14 which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ language code.

Figure 3:
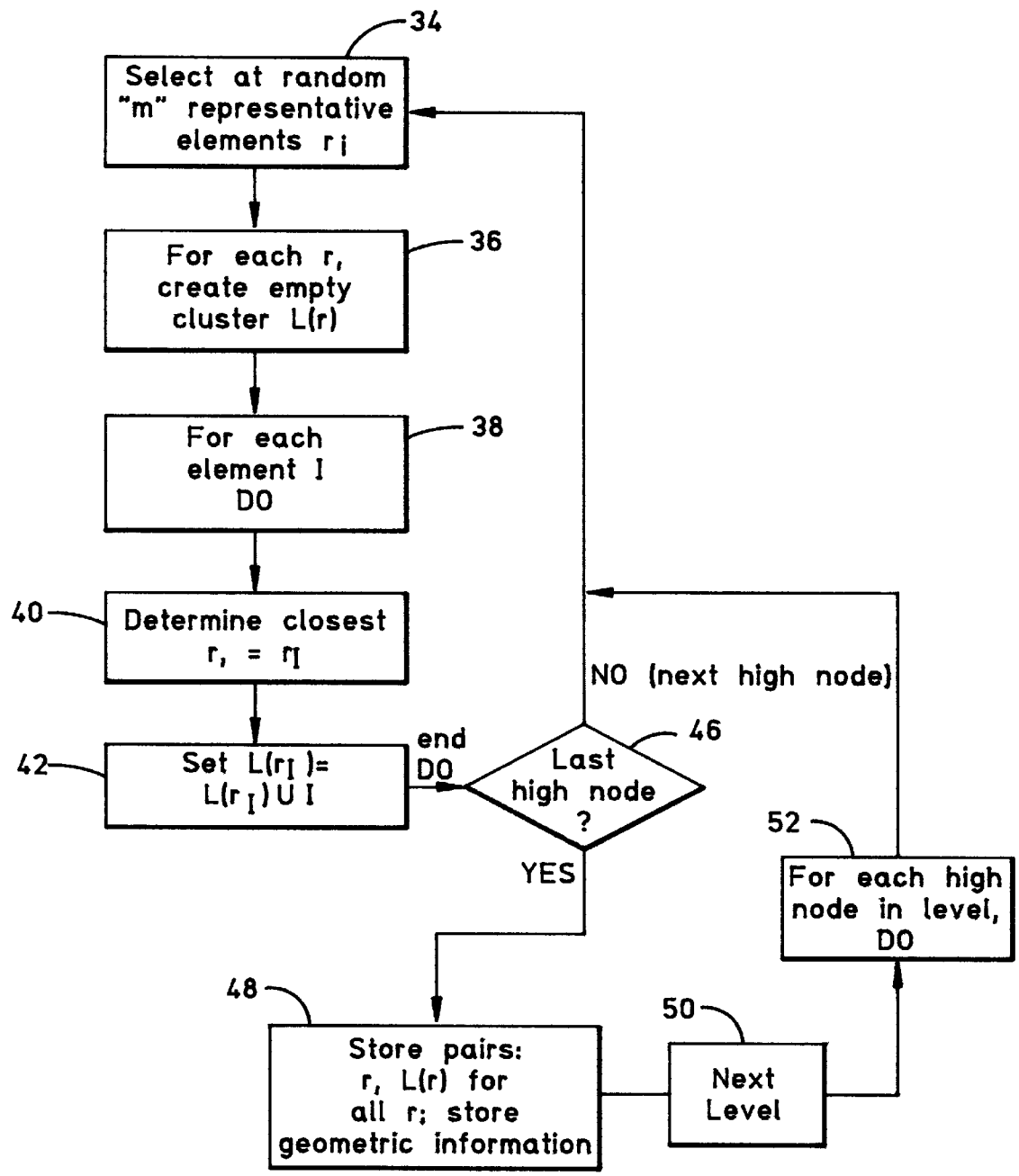
FIG. 3 is a flow chart of the steps for populating the database.
Figure 4:
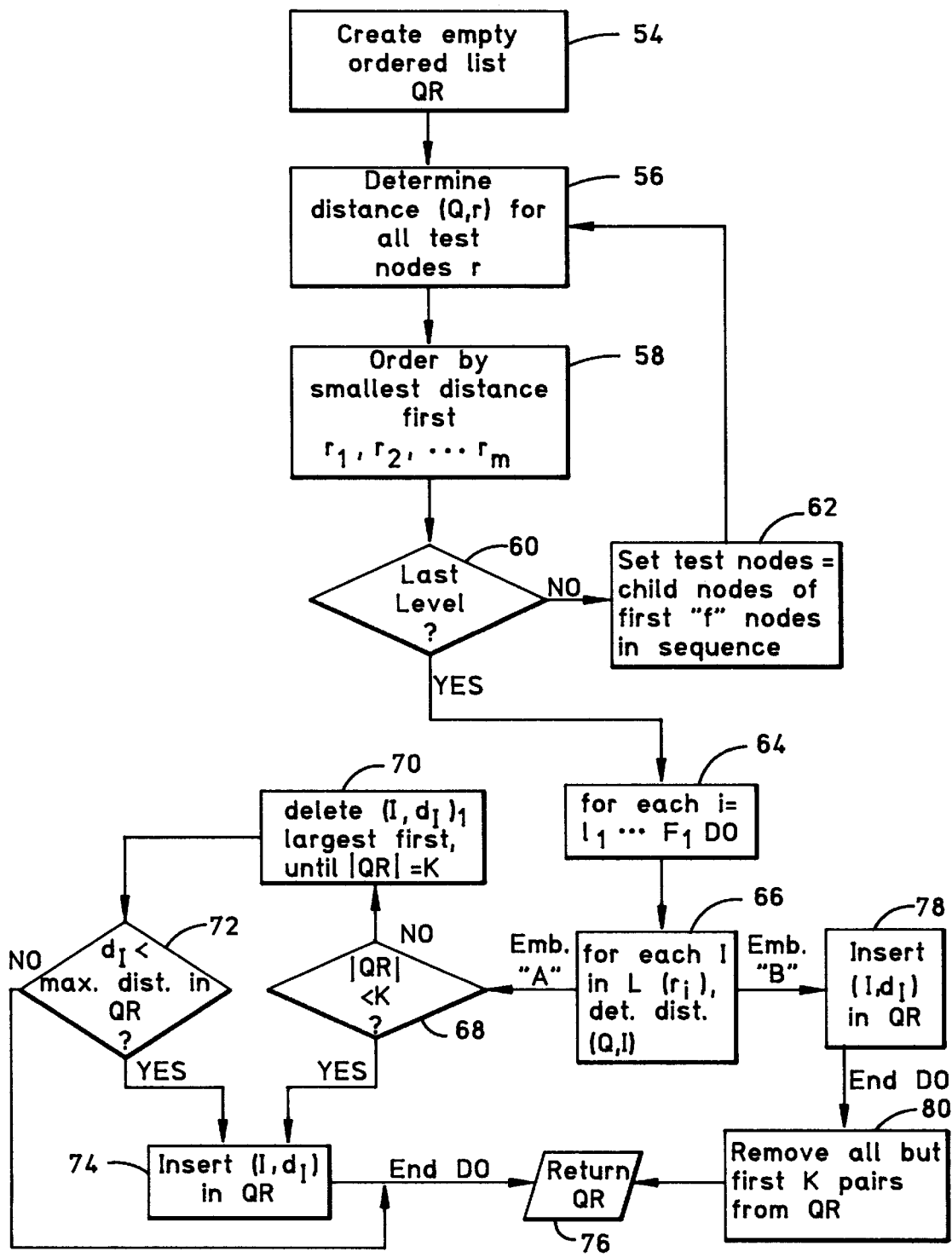
FIG. 4 is a flow chart showing the steps for executing a query to return the "k" closest matches in the database to the query.

FIGS. 3 and 4 illustrate the structure of such instructions as embodied in a computer program. Those skilled in the art will appreciate that FIGS. 3 and 4 illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 1 as a combination of program code elements A-D in computer readable form that are embodied in a computer-usable data medium 18, on the computer diskette 16. As mentioned above, however, such media can also be found in semiconductor devices, on magnetic tape, and on optical disks.

FIG. 1 shows that the system 10 can include peripheral computer equipment known in the art, including an output device such as a video monitor 20 and an input device such as a computer keyboard 22. Other output devices can be used, such as printers, other computers, and so on. Likewise, input devices other than the keyboard 22 can be used, e.g., trackballs, mice, keypads, touch screens, and voice recognition devices.

Figure 2:
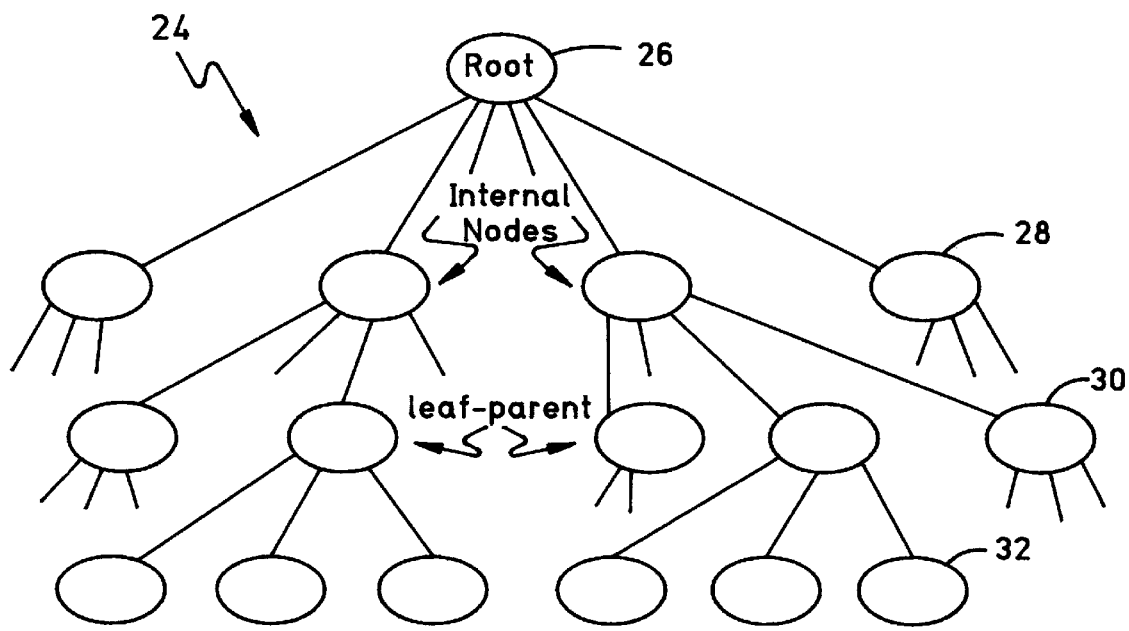
FIG. 2 is a schematic diagram of the preferred database structure.

Additionally, FIG. 1 shows that the computer 12 accesses a database 24. The database 24 can be internal to the computer 12, or it can be remote from the computer 12. FIG. 2 shows the preferred data structure of the database 24 of the present invention.

As shown in FIG. 2, the database 24 is arranged in a tree structure. Specifically, the database 24 includes a single root node 26, and a first level of internal nodes 28 that depend from the root node 26. Each internal node 28 has, as its label, a randomly selected respective representative data point as more fully disclosed below.

Also, the database 24 includes a second level of nodes, referred to herein as leaf-parent nodes, 30. Each leaf-parent node 30 depends from an internal node 28, it being understood in reference to FIG. 2 that at least one and preferably a plurality of leaf-parent nodes 30 depend from each internal node 28. Also, each leaf-parent node 30 has, as its label, a respective representative data point as more fully disclosed below.

In turn, at least one and preferably a plurality of leaves 32 depend from each one of the leaf-parent nodes 30. In accordance with the present invention, a "leaf" is essentially a single data point having no out-going edges, i.e., having no data points dependent from it. It is to be further understood that while FIG. 2 shows three levels of nodes 26, 28, 30, plus a level of leaves 32 for clarity of disclosure, the database 24 can include greater or fewer levels of nodes.

FIG. 3 shows the method by which the population and query module 14 populates the database 24. Starting at block 34, a predetermined number "m" of data points in a relevant set of data points are selected at random and uniformly and designated $r_i$, I=the sequence of integers from 1 to m. The relevant set of data points is all the data points under the high node under test. In the first iteration, the high node under test is the root 26; consequently, the relevant set of data points in the first iteration includes all of the data points in the database 24.

In one presently preferred embodiment, $m=(n)^{1/(N-1)}$, wherein n=number of data points in the database 24 and N=number of node levels in the tree. Thus, in the example shown in FIG. 2, the high node in the first iteration is the root 26, and, consequently, N=4; N−1=3. It is to be understood, however, that the principles of the present invention can be applied using heuristics other than the one set forth herein for determining the value of "m".

Per the present invention, each data element $r_i$ is the label of a respective one of the internal nodes 28 of the database 24. Accordingly, the database 24 has "m" internal nodes 28, each being labeled $r_i$. In other words, each internal node 28 is associated with a respective representative data point $r_i$, and the representative data points are selected randomly from the database.

Next, at block 36 for each label $r_i$ an empty cluster is created and denoted $L(r_i)$. The logic of the module 14 next proceeds to block 38 to enter a "DO" loop for each element I in the set of relevant data points. As stated above, in the first iteration, the set of relevant data points is all the data points in the database 24.

At block 40, for each element I being tested the module 14 determines the closest label $r_i$ to the element I, using a suitable metric to determine "closest" as mentioned above. For each element I, its closest node is designated $r_1$. Then moving to block 42 a cluster $L(r_I)$ is set equal to the union of the element I under test and the cluster $L(r_i)$ associated with the closest label as determined at block 40.

After all elements I in the set of relevant elements has been tested, the logic determines, at decision diamond 46, whether the last high node in the iteration has been tested. For the first iteration, the high node is the single root node 26, so the test at decision diamond 46 for the first iteration will be positive. Accordingly, the logic moves to block 48 to store pairs of the internal node 28 labels r and their associated clusters L(r). Also at block 48, to support certain query execution strategies such as the one shown below in reference to FIG. 5, certain non-Cartesian geometric information related to the data points, and more particularly related to the relative position of each representative at a given level to the elements in the clusters of the other nodes, can be stored. Then, the process moves to block 50.

At block 50, as indicated in FIG. 3, the next level of nodes is considered. Thus, after the first iteration, the next level of high nodes will be the internal nodes 28. After the second iteration, the next level of nodes are considered, progressing down through the tree until the leaf-parent nodes are reached. In the present example shown in FIG. 2, the leaf-parent nodes 30 are the second level of internal nodes and so are processed in the second iteration.

Thus, moving to block 52, the process set forth above is repeated for each high node in the level under test. It accordingly will be appreciated that after the first iteration, at block 52 the logic undertakes the above-disclosed steps for each internal node 28 in a second iteration. Specifically, at the start of the second iteration, from block 52 the logic loops back to block 34 to select at random "m" representative data points under the internal node 28 under test, i.e., the internal node having as its label $r_i$ (I=1 in the first sub-iteration). It is to be understood that these "m" data points become the labels of the leaf-parent nodes 30 that depend from the internal node $r_i$ under test. And, at block 38 the data points tested in the "DO" loop are selected not from the database 24 as a whole, but from only those data points that were associated with the internal node $r_i$.

After the first internal node $r_1$ has been tested, the test at decision diamond 46 is negative, "I" is incremented by unity, and the process loops back to block 34 to test the next internal node. Upon completing the derivation of leaf-parent nodes for the $m^{th}$ internal node 28 using this process, the test at decision diamond 46 is positive, and the logic moves to block 48 to associate leaf-parent labels with respective clusters in a manner analogous to the one described above in relation to the first iteration.

Then, the logic moves to block 50 to test the next level, if there is one. In the example shown in FIG. 2, the only node levels requiring clustering and labeling are the internal nodes 28 and the leaf-parent nodes 30; accordingly, for the example shown, the process of FIG. 3, at this point having labeled and grouped all internal nodes 28 and all leaf-parent nodes 30, ends. With this process, the database 24 is arranged such that the distance between a leaf and the label of its leaf-parent node is less than the distance between the leaf and the label of any other leaf-parent node. Likewise, the distance between a leaf and the label of its associated internal node is less than the distance between the leaf and the label of any other internal node. Stated differently, each node 28, 30 has a cluster of respective dependent data points, i.e., leaves 32, and the distance between each representative data point of a node in a node level and its dependent data points is less than the distance between the dependent data points and the respective representative data point of any other cluster (i.e., node) in the level.

To remove data points from the database 24, the associated leaf 32 is removed. On the other hand, to add a data point to the database 24, the data point is assigned to the closest leaf-parent node 30 using the principles set forth above. Alternatively, a special leaf-parent node can be created to which all new data points are assigned; in such a case, it is to be understood that the special leaf-parent node is always search during the query execution steps discussed below.

Once the database 24 has been arranged as set forth above, the module 14 can traverse the database 24 to execute queries to return a preselected number "k" of close matches to the query. The preferred query execution logic is shown in FIG. 4.

Commencing at block 54, an empty ordered list "QR" is created upon receipt of a query "Q". The logic moves to block 56 to determine the distance between the query "Q" and the representative data point, i.e., the label $r_i$, of each of the nodes under test. In the first iteration, the nodes under test are the internal nodes 28.

Moving to block 58, the nodes $r_i$ are ordered, in the list QR, in sequence from smallest distance (to the query Q) to longest, as determined at block 56. Then, at decision diamond 60, it is determined whether the last level of nodes has been tested. For the example shown in FIG. 2, after the first iteration, the test at decision diamond 60 is negative, whereas after the second iteration it is positive.

When the test at decision diamond 60 is positive, the logic moves to block 62 to define the new test nodes to be the nodes ("child nodes") depend from a predetermined number "f" of selected nodes in the sequences that was generated at block 58. In one embodiment, this would be the first "f" nodes in the sequence. In other words, the new test nodes are the child nodes of a subsequence "f" of old test nodes. As shown, the logic then loops back to block 56 to undertake the process discussed above for the new test nodes. In the example shown in FIG. 2, the leaf-parent nodes 30 that depend from the first "f" internal nodes 28 in the sequence are the test nodes for the second iteration.

Per the present invention, if desired, the value of "f" need not, but can, vary from iteration to iteration and from test node to test node. For simplicity of disclosure, it is assumed herein the value of "f" does not vary. In one preferred embodiment, the value of "f" is one-fifth the value of "m".

Once all node levels have been traversed, the test at decision diamond 60 is positive, and the logic moves to block 64. As indicated in FIG. 4, at block 64 the logic enters a "DO" loop for each I from 1 to F, wherein "F" is the total number of leaf-parent (i.e., non-last level) nodes selected using the above steps. At block 66, the logic determines, for each data point I in the cluster $L(r_i)$ that is associated with the $i^{th}$ node, the distance between the data point I and the query Q.

From block 66, two embodiments of the present invention branch. The first embodiment, denoted in FIG. 4 as embodiment A, proceeds to decision diamond 68 to determine whether the absolute value (i.e., the size) of the list QR is less than the preselected number "k". If it is not, the logic moves to block 70 to delete of data point I—distance pairs from the list QR, starting with the pair having the largest distance first, until the absolute value of the list QR equals the preselected number "k".

From block 70, the process moves to decision diamond 72 to determine whether the distance (denoted $d_I$ in FIG. 4) between the query Q and the data point I under test is less than the maximum distance contained in the list QR. If it is, the logic moves to block 74 to insert the associated data point-distance pair into the list QR. Likewise, if it is determined at decision diamond 68 that the absolute value of the list QR is less than the preselected number "k", the logic moves to block 74. In contrast, if it is determined at decision diamond 72 that the distance that is associated with the data point I under test is not less than the maximum distance contained in the list QR, the logic loops back to test the next data point I in the DO loop initiated at block 64. At the end of the DO loop, the logic returns the list QR at parallelogram 76 as the "k" closest matches to the query Q in the database 24.

In contrast to embodiment A shown in FIG. 4, embodiment B shown therein proceeds from block 66 to block 78, wherein the data point-distance pair ($I, d_I$) that is associated with the data point I under test is inserted into the list QR. At the end of the DO loop, the logic moves to block 80 to remove all but the first k pairs from the list QR, which is ordered according to distance, closest data point first. From block 80, the logic returns the list QR at parallelogram 76 as the "k" closest matches to the query Q in the database 24.

Figure 5:
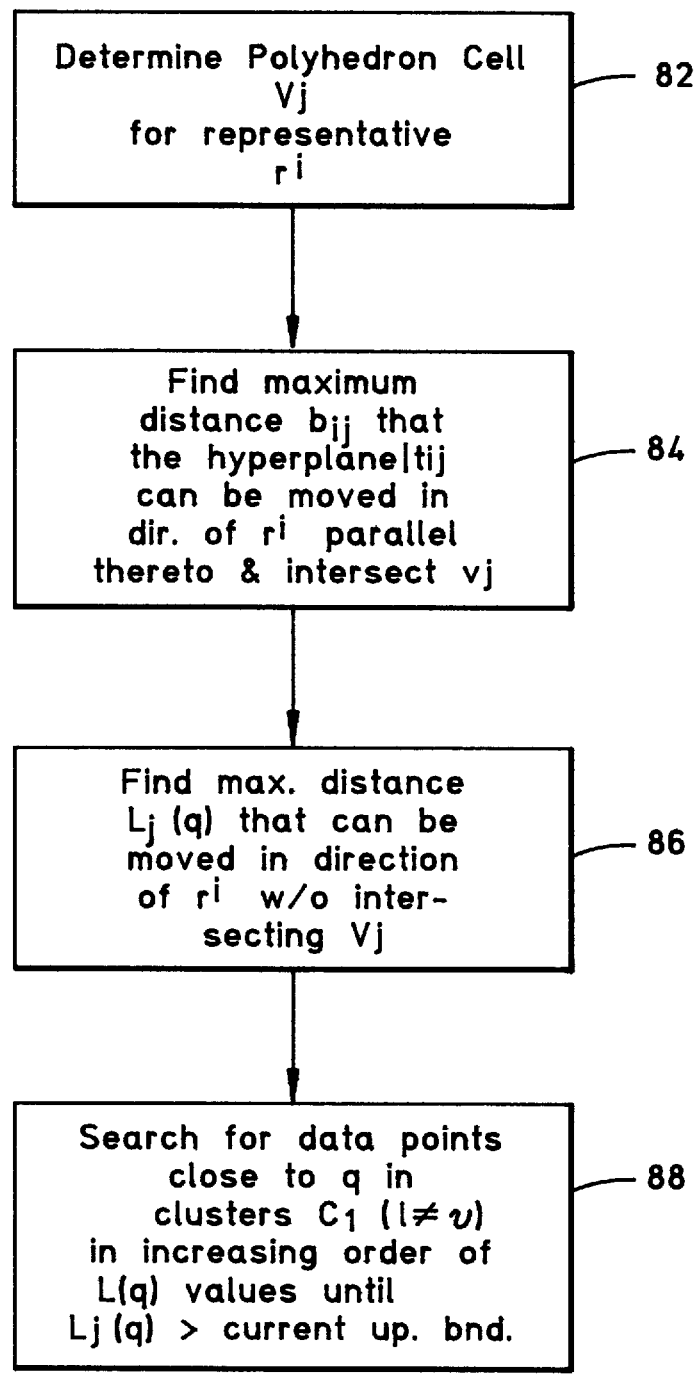
FIG. 5 is a flow chart of an alternate embodiment for ranking data nodes for search during a query execution.

Now referring to FIG. 5, an alternate method for selecting the nodes to be tested during a query execution is shown. The method of FIG. 5 orders nodes based on geometric relationships between their respective representative data points and other predetermined data points. Essentially, the method discussed below finds lower bounds between representative data points, and then orders the nodes in a sequence, smallest lower bound first, provided each node in the sequence has a lower bound that is less than the highest upper bound between a node in the sequence and a query Q. Then, only nodes in the sequence are returned for the query execution steps discussed previously.

Commencing at block 82, in the first of two methods for determining the lower bounds, a so-called Voronoi polyhedron cell $V_j$ is determined for each representative data point $r^j$ based on the geometric relationship between the data point $r^i$ and each other representative data point $r^i$. More specifically, the Voronoi cell $V_j$ of the $j^{th}$ representative data point "r" is $$V_j = \{x \in R^d | (\forall I) \; (\|x-r^j\| \leq \|X-r^i\|)\} = $$
$$\{X \in R^d | (\forall I) \; (R^{ij} \cdot X \geq (\|r^{i2}\| - \|r^{j2}\|)/2 \|r^i - r^j\|\},$$

wherein $R_d$ is the set of data points in the database and $r^{ij}$ is the unit vector in the direction of the line determined by the representative data points under test=$(r^i - r^j)/\|r^i - r^j\|$.

Next, at block 84, using linear programming the distance $b_{ij}$=Maximum$\{r^{ij} \cdot X | x \in V_j\}$ is determined, wherein $b_{ij}$ is the maximum distance that the hyperplane $H_{ij} \equiv \{x \in R^d | r^{ij} \cdot X = r^{ij} \cdot r^i\}$ can be moved in the direction of $r^i$ parallel to itself, while still intersecting the polyhedron cell $V_j$. Per the present invention, the steps at blocks 82 and 84 can be undertaken in advance of receiving a query.

Moving to block 86 after receiving a query q that is in a polyhedron cell $V_j$, a maximum distance $L_j(q)$ that a hyperplane $H_{ij}(q)$ can be moved in the direction of $r^i$ without intersecting the $j^{th}$ polyhedron cell $V_j$ is determined to be a lower bound for the node under test as follows:

$$L_j(q) = r^{ij} \cdot (q - r^j) b_{ij},$$

wherein the hyperplane $H_{ij}(q) \equiv \{x \in R^d | r^{ij} \cdot x = r^{ij} \cdot q\}$.

It is desired to return the "k" closest data clusters $C_1$ (1 not being the node of the closest representative data point to the query q) for searching thereof for matches to the query q. Accordingly, the nodes are arranged in a sequence, from smallest distance $L_j(q)$, with the distance $_kL(q)$ establishing a current upper bound. The sequence is established such that $L_1(q)$>than the current upper bound, i.e., the lower bounds of the nodes not contained in the sequence are greater than those contained in the sequence.

In an alternate embodiment, the various distances $b_{ij}$ need not be determined by the linear programming steps described above, but instead may be determined by determining the maximum distance the hyperplane $H_{ij}(q)$ can be moved in the direction of $r_j$ before it meets one of the data points in the polyhedron cell $_jV$ by directly enumerating these data points.

While the particular FAST QUERY SEARCH IN LARGE DIMENSION DATABASE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer including a data storage device including a computer usable medium having computer usable code means for identifying data points that are similar to a query, the data points being stored in a database accessible by the computer, the computer usable code means having:

computer readable code means for arranging the database in a tree structure having at least an internal node level including internal nodes, a leaf-parent node level including leaf-parent nodes, and a leaf level including leaves, each internal node and leaf-parent node representing clusters of data points, each cluster being defined by (1) a respective randomly selected representative data point and (2) respective dependent data points, the distance between each representative data point in a level and its dependent data points being less than the distance between the dependent data point and the respective representative data point of any other cluster in the level;

computer readable code means for receiving a query Q and in response determining respective query distances between the query Q and at least some of the representative data points;

computer readable code means for arranging the internal nodes of the respective at least some of the representative data points in a sequence from smallest query distance to greatest query distance; and computer readable code means for returning a subsequence having a predetermined number of internal nodes, starting with the first node in the sequence.

2. The computer of claim 1, further comprising:

computer readable code means for receiving the subsequence of internal nodes and, for each internal node in the subsequence of internal nodes, determining respective query distances between the query Q and each representative data point in each leaf-parent node of the internal node;

computer readable code means for listing the leaf-parent nodes of each internal node in the subsequence of internal nodes in a sequence from smallest query distance to greatest query distance; and computer readable code means for returning a subsequence of leaf-parent nodes having a predetermined number of leaf-parent nodes.

3. The computer of claim 2, further comprising:

computer readable code means for receiving the subsequence of leaf-parent nodes and, for each leaf in the subsequence of leaf-parent nodes, determining respective query distances between the query Q and each leaf;

computer readable code means for arranging the leaves of each leaf-parent node in the subsequence of leaf-parent nodes in a leaf sequence from smallest query distance to greatest query distance; and computer readable code means for returning the first k leaves in the leaf sequence.

4. The computer of claim 3, further comprising computer readable code means for adding a data point to the database by adding a new leaf to the tree, the new leaf having, as a label, the data point, the new leaf being added to a leaf-parent node having a representative data point closer to the new leaf than the representative data points of the other leaf nodes.

5. The computer of claim 4, further comprising means for removing a data point in the database by deleting a leaf from the tree.

6. The computer of claim 3, further comprising computer readable code means for adding a data point to the database by adding a new leaf to the tree, the new leaf having, as a label, the data point, the new leaf being added to an auxiliary leaf-parent node, the auxiliary leaf-parent node being traversed for each query.

7. The computer of claim 5, further comprising means for removing a data point from the database by deleting a leaf from the tree.

8. A computer-implemented method for arranging data points in a database, comprising:

defining a first level of nodes including internal nodes, each internal node being labeled by a representative data point, the representative data points being randomly selected;

defining a second level of nodes including leaf-parent nodes, each leaf-parent node depending from an internal node, each leaf-parent node being labeled by a representative data point, each leaf-parent node including at least one leaf labeled by a data point, wherein the distance between a leaf and the label of its leaf-parent node is less than the distance between the leaf and the label of any other leaf-parent node.

9. The computer-implemented method of claim 8, further comprising:

receiving a query Q and in response determining respective query distances between the query Q and each representative data point in each internal node;

arranging the internal nodes in a sequence from smallest query distance to greatest query distance; and returning a subsequence having a predetermined number of internal nodes, starting with the first node in the sequence.

10. The computer-implemented method of claim 9, further comprising:

receiving the subsequence of internal nodes and, for each internal node in the subsequence of internal nodes, determining respective query distances between the query Q and each representative data point in each leaf-parent node;

arranging the leaf-parent nodes of each internal node in the subsequence of internal nodes in a sequence from smallest query distance to greatest query distance; and returning a subsequence of leaf-parent nodes having a predetermined number of leaf-parent nodes.

11. The computer-implemented method of claim 10, further comprising:

receiving the subsequence of leaf-parent nodes and, for each leaf in the subsequence of leaf-parent nodes, determining respective query distances between the query Q and each leaf;

arranging the leaves of each leaf-parent node in the subsequence of leaf-parent nodes in a leaf sequence from smallest query distance to greatest query distance; and returning the first k leaves in the leaf sequence.

12. The computer-implemented method of claim 11, further comprising adding a data point to the database by adding a new leaf to the tree, the new leaf having, as a label, the data point, the new leaf being added to a leaf-parent node having a representative data point closer to the new leaf than the representative data points of the other leaf nodes.

13. The computer-implemented method of claim 12, further comprising removing a data point from the database by deleting a leaf from the tree.

14. The computer-implemented method of claim 11, further comprising adding a data point to the database by adding a new leaf to the tree, the new leaf having, as a label, the data point, the new leaf being added to an auxiliary leaf-parent node, the auxiliary leaf-parent node being traversed for each query.

15. The computer-implemented method of claim 14, further comprising removing a data point from the database by deleting a leaf from the tree.

16. The computer-implemented method of claim 14, undertaken in combination with a digital processing apparatus.

17. A computer program device comprising:

a computer program storage device readable by a digital processing apparatus; and a program means on the program storage device and including instructions for causing the digital processing apparatus to return "k" close matches in a database to a query Q, the database being arranged in a tree having nodes, each node being labeled by a respective representative data point, by:

receiving a query Q and in response determining respective query distances between the query Q and each representative data point in a predetermined number of test nodes;

arranging the test nodes in a sequence from smallest query distance to greatest query distance; and returning a subsequence having a predetermined number of test nodes, starting with the first test node in the sequence.

18. The computer program device of claim 17, wherein the tree has at least an internal node level including internal nodes, a leaf-parent node level including leaf-parent nodes, and a leaf level including leaves, each internal node and leaf-parent node representing clusters of data points, each cluster being defined by (1) a respective randomly selected representative data point and (2) respective dependent data points, the test nodes being internal nodes and the subsequence being a subsequence of internal nodes, the instructions further causing the computer to:

receive the subsequence of internal nodes and, for each internal node in the subsequence of internal nodes, determine respective query distances between the query Q and each representative data point in each leaf-parent node;

arrange the leaf-parent nodes of each internal node in the subsequence of internal nodes in a sequence from smallest query distance to greatest query distance; and return a subsequence of leaf-parent nodes having a predetermined number of leaf-parent nodes.

19. The computer program device of claim 18, wherein the instructions further cause the computer to:

receive the subsequence of leaf-parent nodes and, for each leaf in the subsequence of leaf-parent nodes, determine respective query distances between the query Q and each leaf;

arrange the leaves of each leaf-parent node in the subsequence of leaf-parent nodes in a leaf sequence from smallest query distance to greatest query distance; and return the first k leaves in the leaf sequence.

20. The computer program device of claim 19, wherein the instructions further cause the computer to:

add a data point to the database by adding a new leaf to the tree, the new leaf having, as a label, the data point, the new leaf being added to a leaf-parent node having a representative data point closer to the new leaf than the representative data points of the other leaf nodes.

21. The computer program device of claim 19, wherein the instructions further cause the computer to:

add a data point to the database by adding a new leaf to the tree, the new leaf having, as a label, the data point, the new leaf being added to an auxiliary leaf-parent node, the auxiliary leaf-parent node being traversed for each query.

22. The computer program device of claim 20 or 21 wherein the instructions further cause the computer to remove a data point from the database by deleting a leaf from the tree.

23. The computer program device of claim 18, in combination with a digital processing apparatus.

24. A computer including a data storage device including a computer usable medium having computer usable code means for identifying data points that are similar to a query, the data points being stored in a database accessible by the computer, the computer usable code means having:

computer readable code means for arranging the database in a tree structure having data nodes, each node containing clusters of data points, each cluster being defined by (1) a respective randomly selected representative data point and (2) respective dependent data points;

computer readable code means for recording geometric information for each node;

computer readable code means for receiving a query Q and in response listing the nodes in a sequence of increasing order of lower bounds, the lower bounds being determined based on the geometric information; and computer readable code means for returning the sequence of the nodes for searching thereof.

25. The computer of claim 24, further comprising:

computer readable code means for listing in the sequence of nodes only nodes having lower bounds less than a current upper bound between the query Q and a representative data point, the current upper bound being the greatest lower bound of a representative data point in the sequence.

26. The computer of claim 25, further comprising:

computer readable code means for determining a distance between a first representative data point and a second representative data point by determining, for the first representative data point, a polyhedron cell, and determining a first maximum distance that a hyperplane containing the first and second representative data points can be moved, in a direction parallel to a line connecting the first and second representative data points while intersecting the polyhedron cell.

27. The computer of claim 26, further comprising:

computer readable code means for determining an upper bound between the query Q and a representative data point by determining a maximum distance that a hyperplane containing the query Q and the representative data point can be moved in a predetermined direction without intersecting the polyhedron cell.

28. The computer of claim 25, further comprising:

computer readable code means for determining a distance between a first representative data point and a second representative data point by determining a first maximum distance that a hyperplane containing the first and second representative data points can be moved in a direction parallel to a line connecting the first and second representative data points while intersecting at least one predetermined data point.

29. The computer of claim 28, further comprising:

computer readable code means for determining an upper bound between the query Q and a representative data point by determining a maximum distance that a hyperplane containing the query Q and the representative data point can be moved in a predetermined direction without intersecting at least one predetermined data point.

* * * * *